United States Patent [19]
Busato et al.

[11] Patent Number: 6,152,115
[45] Date of Patent: Nov. 28, 2000

[54] INTEGRATED ENGINE INTAKE MANIFOLD HAVING A FUEL VAPOR PURGE VALVE AND AN EXHAUST GAS RECIRCULATION VALVE

[75] Inventors: Murray F. Busato; David W. Balsdon; John E. Cook, all of Chatham, Canada

[73] Assignee: Siemens Canada Limited, Mississauga, Canada

[21] Appl. No.: 09/030,222

[22] Filed: Feb. 25, 1998

Related U.S. Application Data

[60] Provisional application No. 60/051,906, Jul. 8, 1997, provisional application No. 60/058,077, Sep. 5, 1997, and provisional application No. 60/058,316, Sep. 9, 1997.

[51] Int. Cl.$^7$ .................................................. F02M 33/04
[52] U.S. Cl. .................................. 123/520; 123/568.17
[58] Field of Search .............................. 123/516, 518, 123/519, 520, 568.17, 568.18

[56] References Cited

U.S. PATENT DOCUMENTS

| | | | |
|---|---|---|---|
| 4,308,841 | 1/1982 | Kingsley | 123/520 |
| 4,539,960 | 9/1985 | Cowles | 123/516 |
| 4,776,313 | 10/1988 | Freismuth et al. | 123/470 |
| 5,003,933 | 4/1991 | Rush, II et al. | 123/52 |
| 5,207,714 | 5/1993 | Hayashi et al. | 123/568.17 |
| 5,425,347 | 6/1995 | Zinkie, II | 123/568 |
| 5,433,183 | 7/1995 | Vansnick | 123/568 |
| 5,492,104 | 2/1996 | Elder et al. | 123/568 |
| 5,542,711 | 8/1996 | Vaudry | 285/41 |
| 5,609,143 | 3/1997 | Schellenberg et al. | 123/568 |
| 5,666,930 | 9/1997 | Elder | 123/568.17 |

FOREIGN PATENT DOCUMENTS

| | | |
|---|---|---|
| 07 01 054 | 3/1996 | European Pat. Off. . |
| 074 00 66 | 10/1996 | European Pat. Off. . |
| 195 19 204 | 12/1996 | Germany . |
| 196 21 221 | 11/1997 | Germany . |
| 197 40 998 | 3/1998 | Germany . |
| 080 21 315 | 1/1996 | Japan . |
| WO 96 16 263 | 5/1996 | WIPO . |

OTHER PUBLICATIONS

Bauhof, Michael J. et al, "Design Of An EGR Interface For Thermoplastic Intake Manifolds", *SAE Technical Paper Series.* International Congress and Exposition, Detroit, Michigan; Mar. 1–5, 1993, vol. 930086.

*Primary Examiner*—Thomas N. Moulis

[57] ABSTRACT

An internal combustion engine intake manifold has a wall separating internal manifold space from an external space. A purge valve for purging fuel vapors from an evaporative emission space of a fuel storage system for the engine mounts on the wall external to the internal manifold space and places a purge outlet port of the purge valve in communication with the internal manifold space. An EGR valve for recirculating engine exhaust gases mounts on the wall such that an EGR outlet port of the EGR valve is communicated to the internal manifold space.

10 Claims, 14 Drawing Sheets

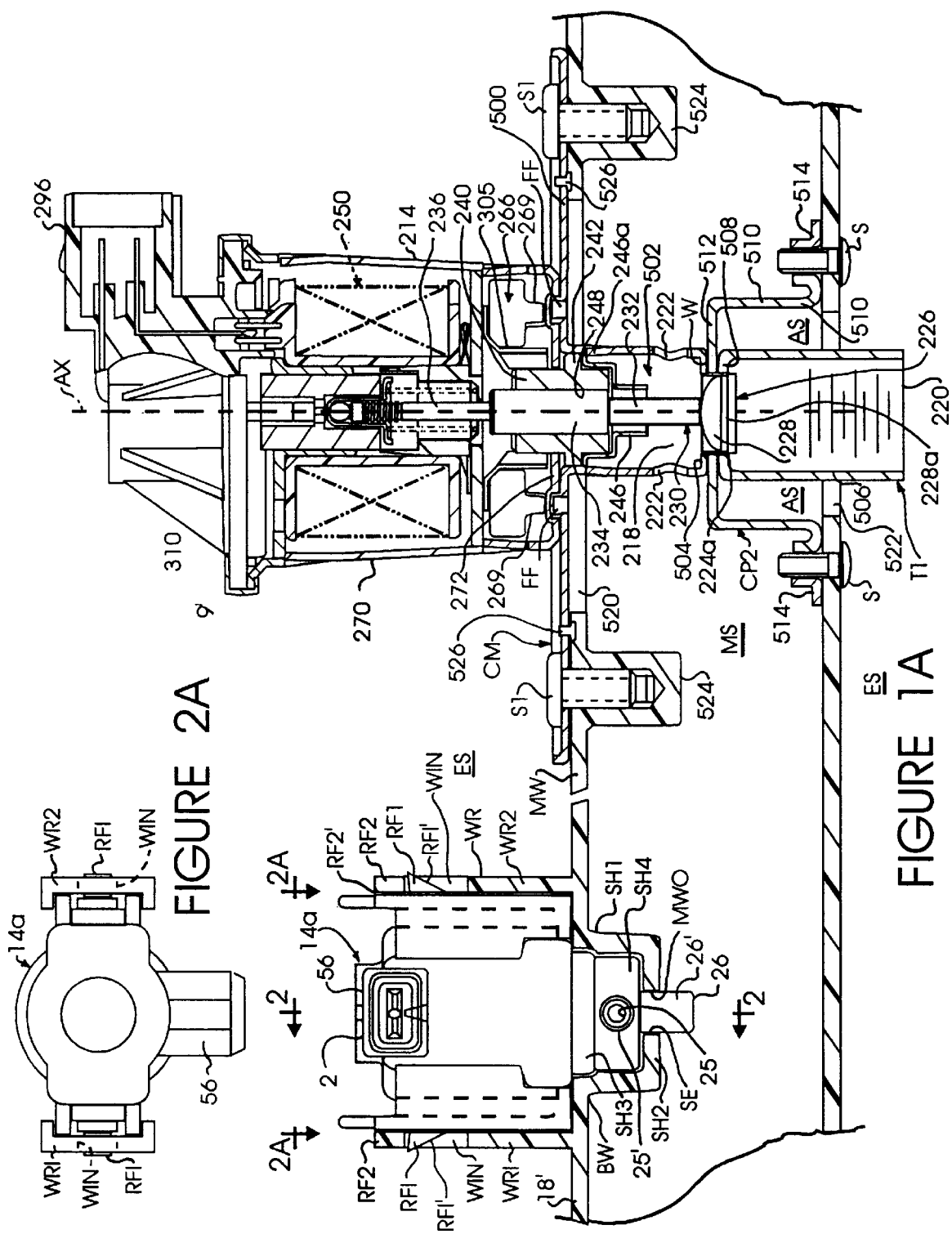

INTEGRATED ENGINE INTAKE MANIFOLD HAVING A FUEL VAPOR PURGE VALVE AND AN EXHAUST GAS RECIRCULATION VALVE

This application claims benefit of Provisional application Ser. No. 60/051,906 filed Jul. 8, 1997 and Provisional application Ser. No. 60/058,077 filed Sep. 5, 1997 and Provisional application Ser. No. 60/058,316 filed Sep. 9, 1997.

FIELD OF THE INVENTION

This invention relates to the integration of automotive emission control valves and intake manifolds of internal combustion engines of automotive vehicles.

BACKGROUND OF THE INVENTION

Controlled engine exhaust gas recirculation is a known technique for reducing oxides of nitrogen in products of combustion that are exhausted from an internal combustion engine to atmosphere. A known EGR system comprises an EGR valve that is controlled in accordance with engine operating conditions to regulate the amount of engine exhaust gas that is recirculated to the induction fuel-air flow entering the engine for combustion so as to limit the combustion temperature and hence reduce the formation of oxides of nitrogen.

It is known to mount EGR valves on engine intake manifolds where the valves are subject to a harsh operating environment that includes wide temperature extremes and vibrations. Stringent demands imposed by governmental regulation of exhaust emissions have created a need for improved control of such valves. Use of an electric actuator is one means for obtaining improved control, but in order to commercially successful, such an actuator must be able to operate properly in such extreme environments for an extended period of usage. Moreover, in mass-production automotive vehicle applications, component cost-effectiveness and size may be significant considerations. An EGR valve that possesses more accurate and quicker response can be advantageous by providing improved control of tailpipe emissions, improved driveability, and/or improved fuel economy for a vehicle having an internal combustion engine that is equipped with an EGR system. A valve that is more compact in size can be advantageous because of limitations on available space in a vehicle engine compartment. It should also be possible to attain further economies and benefits by more fully integrating EGR valves with intake manifolds.

Hydrocarbon emissions from automotive vehicles are also subject to strict governmental regulations. It is known to associate a vapor collection system with a vehicle's fuel storage system. Volatized fuel from a fuel tank is temporarily stored in a vapor collection canister. At times, the collected fuel vapors are purged to the engine intake manifold via a canister purge valve. There, vapors entrain with combustible mixture flow into the engine where they are combusted. Precise control of purge flow is important in complying with relevant regulations and obtaining proper engine operation. Accordingly, it is also known to utilize pressure compensated, electrically controlled canister purge valves. It is believed that integration of a canister purge valve with an engine intake manifold can provide certain economies and advantages.

SUMMARY OF THE INVENTION

One general aspect of the present invention relates to an internal combustion engine intake manifold comprising a wall separating internal manifold space from an external space, a purge valve for purging fuel vapors from an evaporative emission space of a fuel storage system for the engine, the purge valve comprising a purge valve body having a purge inlet port for receiving fuel vapors from the evaporative emission space and a purge outlet port for delivering fuel vapors to the internal manifold space, a purge valve mount for mounting the purge valve body on the wall external to the internal manifold space and placing the purge outlet port in communication with the internal manifold space, and an EGR valve for recirculating engine exhaust gases, the EGR valve comprising an EGR body, an EGR inlet port for receiving engine exhaust gases, and an EGR outlet port for delivering engine exhaust gases to the internal manifold space, an EGR valve mount for mounting the EGR valve body on the wall such that the EGR outlet port is communicated to the internal manifold space.

Within this general aspect, more specific aspects relate to: the manifold wall comprising plastic material; the purge valve mount mounting the purge valve body such that a portion of the purge valve body that contains the purge outlet port confronts the wall, and the portion of the wall confronted by that portion of the purge valve body comprises an opening through which the outlet port directly communicates with the internal manifold space; the purge valve outlet port comprising a nipple, and the wall comprising an opening through which the nipple passes to communicate the purge valve outlet port with the internal manifold space; the wall comprising opposite wall portions each containing a respective through-hole, the EGR mount comprising a first mounting portion on the valve body mounting the EGR valve body on the manifold wall in closure of a first of the manifold wall through-holes, and a second mounting portion that comprises a tube for conveying exhaust gases to the EGR valve inlet port and a surrounding wall in closure of a second of the manifold wall through-holes, the surrounding wall coacting with the tube to form an annular space that surrounds the tube, protrudes through the second through-hole, and extends to at least the edge of the second through-hole; the EGR outlet port being disposed in the internal manifold space and the EGR inlet port being disposed external to the manifold space.

Another general aspect of the present invention relates to a fuel vapor purge valve and an exhaust gas recirculation valve mounted on an engine manifold. Within this general aspect, more specific aspects relate to: the manifold comprising plastic material; the manifold being an intake manifold of an internal combustion engine; each valve comprising a respective outlet port that is directly communicated to interior space of the manifold; and the outlet port of each valve being disposed within the interior space of the manifold.

The foregoing, and other features, along with various advantages and benefits of the invention, will be seen in the ensuing description and claims which are accompanied by drawings. The drawings, which are incorporated herein and constitute part of this specification, disclose a preferred embodiment of the invention according to the best mode contemplated at this time for carrying out the invention.

BRIEF DESCRIPTION OF THE DRAWINGS

FIG. 1A is a cross-sectional view through a portion of an engine intake manifold containing an integrated intake manifold engine emission control system of FIG. 1.

FIG. 2A is a full view in the direction of arrows 2A—2A in FIG. 2.

DESCRIPTION OF THE PREFERRED EMBODIMENT

I.) DESCRIPTION OF INTEGRATED ENGINE INTAKE MANIFOLD HAVING A FUEL VAPOR PURGE VALVE AND AN EXHAUST GAS RECIRCULATION VALVE WITH REFERENCE TO FIGS. 1 AND 1A

Figure 1:
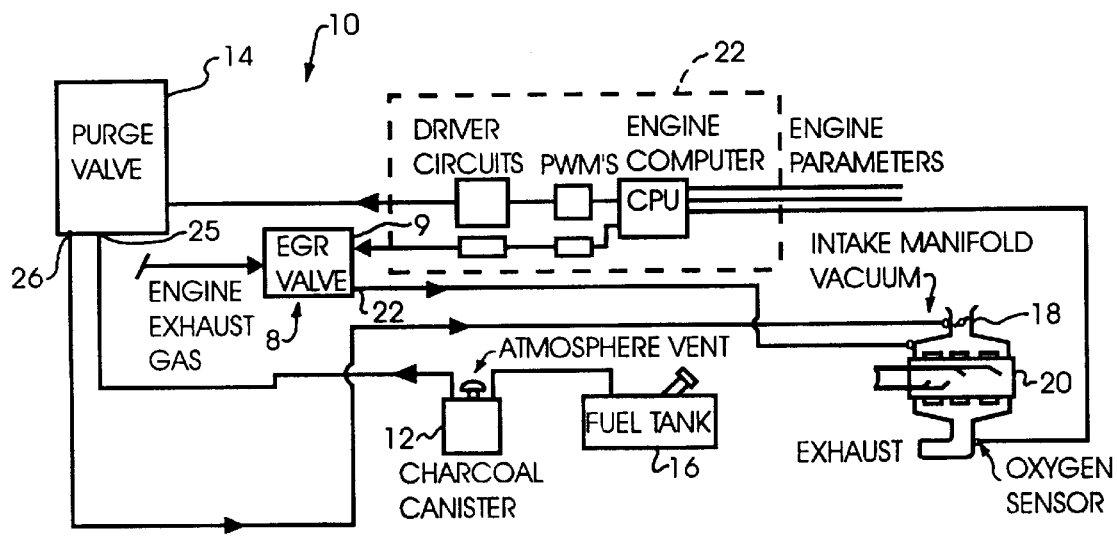
FIG. 1 is a schematic diagram of an integrated intake manifold engine emission control system comprising two emission control valves, according to principles of the invention.
Figure 2B:
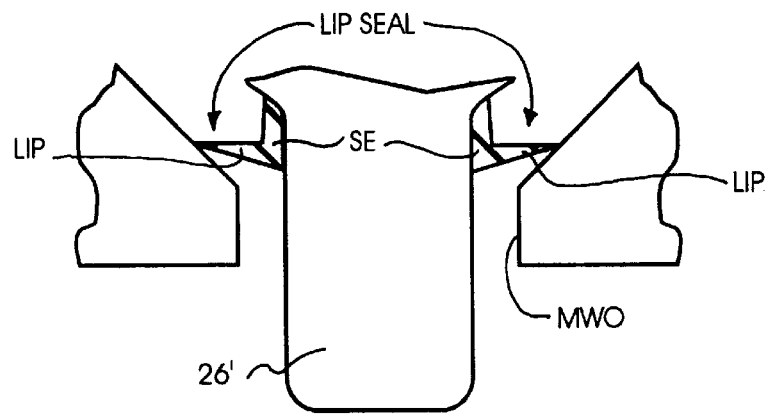
FIG. 2B is an enlarged fragmentary view of a portion of FIG. 1A.
Figure 2:
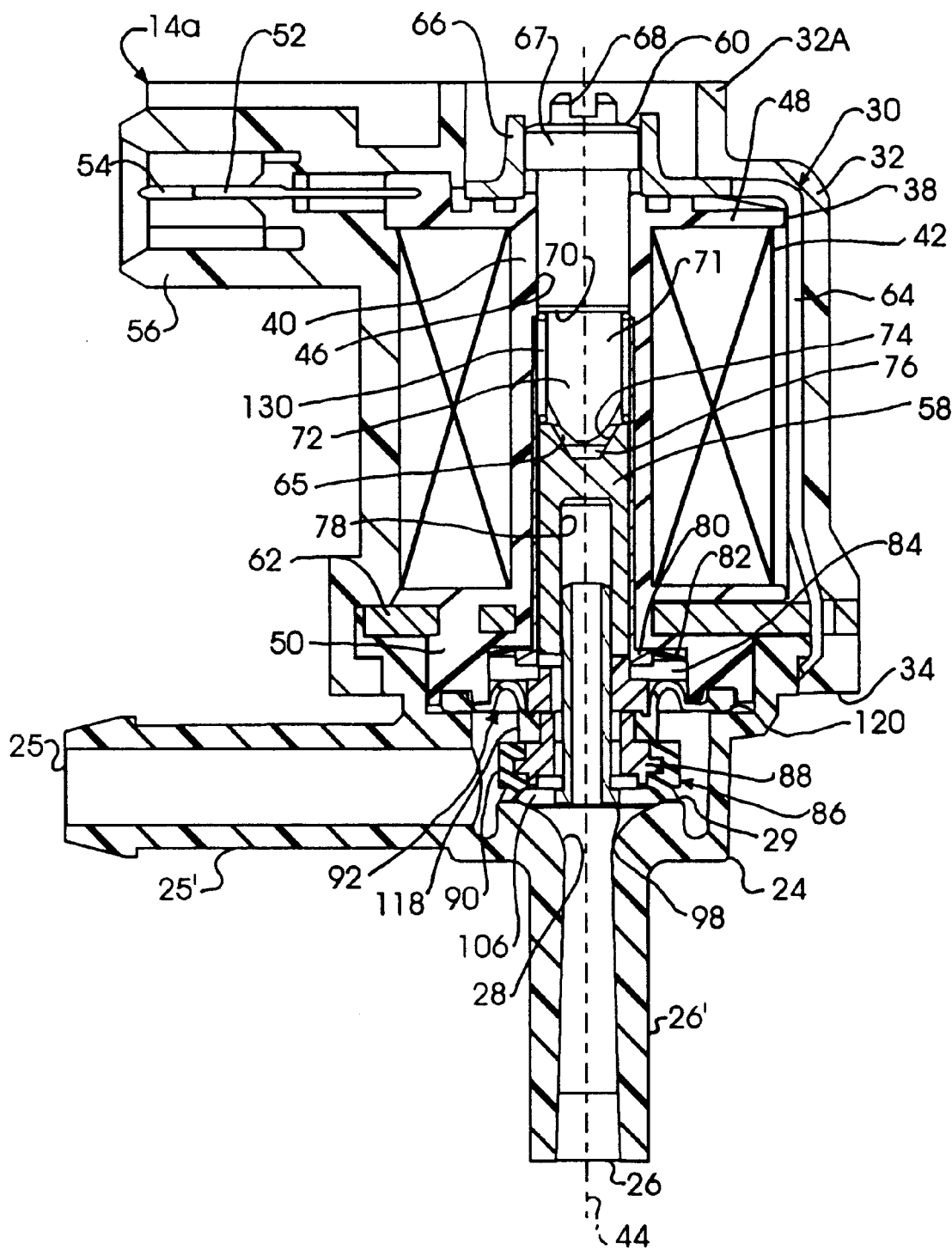
FIG. 2 is a longitudinal cross section view of a first of the emission control valves of FIG. 1 by itself on a larger scale, taken in the direction of arrows 2—2 in FIG. 1A.
Figure 3:
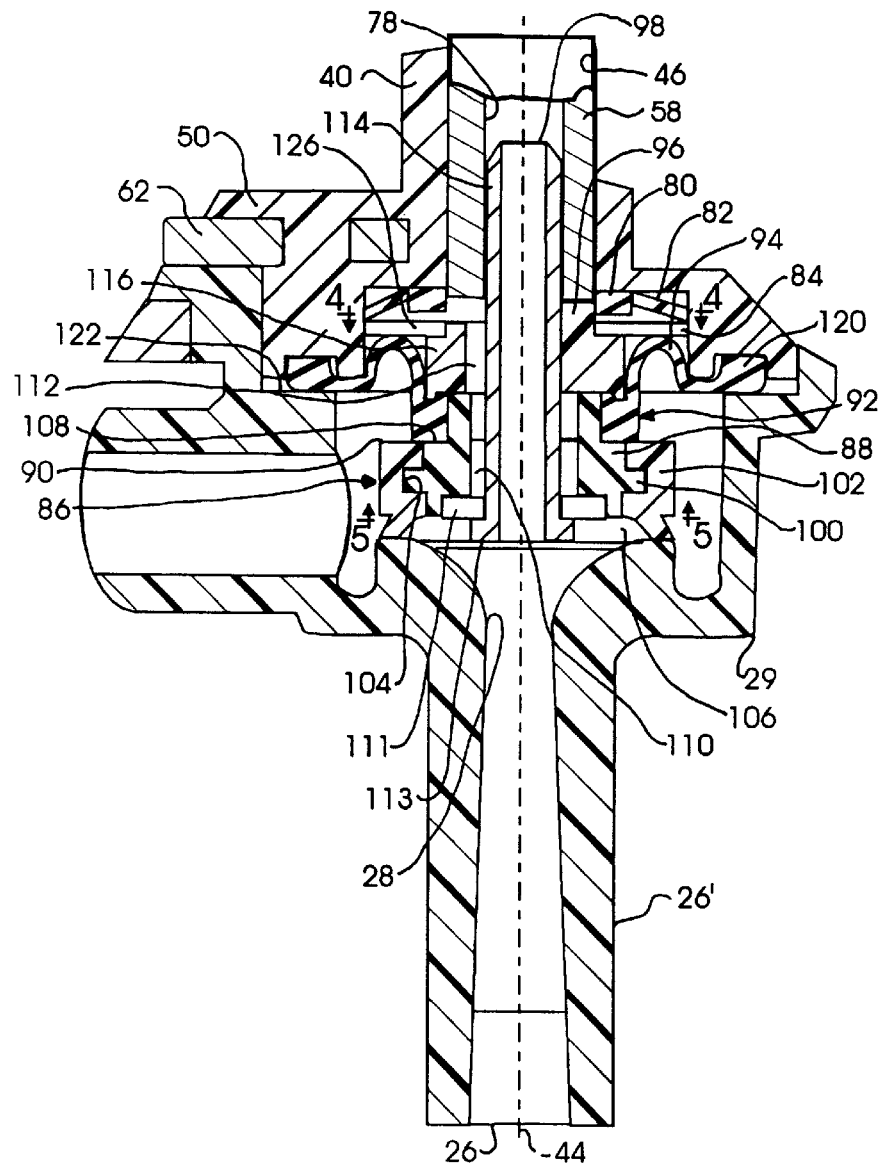
FIG. 3 is an enlarged fragmentary view of a portion of FIG. 2.
Figure 5:
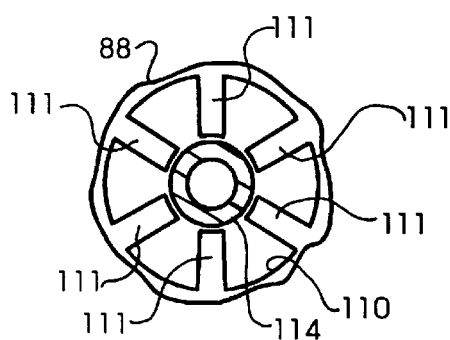
FIG. 5 is a fragmentary transverse cross section view in the direction of arrows 5—5 in FIG. 3.
Figure 4:
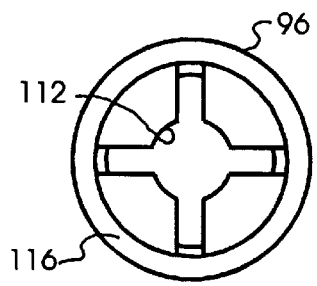
FIG. 4 is a partial transverse cross section view in the direction of arrows 4—4 in FIG. 3.

FIG. 1 shows two emission control systems of an internal combustion engine powered automotive vehicle, the first being an evaporative emission control system 10' and the second being an engine exhaust gas recirculation system 8'.

System 101 comprises a vapor collection canister (charcoal canister) 12' and an electric-operated fuel vapor purge valve 14a connected in series between a fuel tank 161 and an intake manifold 18' of an internal combustion engine 20'. An engine management computer 22 that receives various input signals, including various engine operating parameter signals, supplies a purge control output signal for operating valve 14a by processing certain of the various input signals in accordance with certain program algorithms.

System 8' comprises an electric-operated exhaust gas recirculation (EEGR) valve 9' connected between a point in the engine exhaust system and intake manifold 18'. Engine management computer 22 supplies an EGR control output signal for operating valve 9' by processing certain of the various input signals in accordance with certain program algorithms. Being schematic in nature, FIG. 1 shows both valves 9' and 14a apart from manifold 18', although they are in fact mounted on the manifold as shown in FIG. 1A.

FIG. 1A is a cross-sectional view through a portion of engine intake manifold 18' to show both purge valve 14a and EEGR valve 9' mounted on intake manifold 18'. Intake manifold 18' is fabricated from a suitable plastic (polymeric) material that provides a walled structure MW containing an internal manifold space MS for distributing induction flow that has entered the manifold to the engine cylinders. The entering induction flow may be air that has passed through a throttle body, and the manifold may also mount electric-operated fuel injectors (not shown) proximate inlet valve mechanisms at each engine cylinder to create a combustible fuel-air charge for each cylinder when the corresponding intake valve mechanism opens the cylinder. When purge valve 14a is open, vacuum created in manifold space MS by the running of the engine draws fuel vapors from an evaporative emission space that includes canister 12' into manifold space MS for entrainment with the induction flow and ensuing entry into the engine cylinders as part of the combustible charge. When EEGR valve 9' is open, the pressure differential between vacuum in manifold space MS and the engine exhaust draws engine exhaust gases from the engine exhaust gas system into manifold space MS for doping the fuel-air charges that enter the engine cylinders.

II.) DETAILED DESCRIPTION OF FUEL VAPOR PURGE VALVE AND MOUNTING OF FIGS. 1 AND 1A WITH REFERENCE TO FIGS. 2, 2A, 2B, and 3–10

Detail of purge valve 14a appears in FIGS. 2, 2A, 2B, and 3–5. Valve 14a comprises a body part 24 having an inlet port 25 and an outlet port 26, the latter including a sonic nozzle structure 28. Body part 24 is fabricated from suitable fuel-tolerant material, such as by injection molding, and embodies the two ports as respective nipples 25', 26'. At the internal end of the nipple 26' that forms outlet port 26, an annular seating surface 29 circumscribes an internal main flow passage extending between the two ports.

Valve 14a further comprises a solenoid assembly 30 that is housed within an overmold 32. A joint 34 joins overmold 32 with body part 24 such that the two may be considered to constitute the body of valve 14a.

Solenoid assembly 30 comprises a polymeric bobbin 38 around whose central tubular core 40 an electromagnetic coil 42 is disposed. Reference numeral 44 designates an imaginary longitudinal axis of valve 14a with which core 40 and outlet port 26 are coaxial. Core 40 comprises a circular cylindrical through-hole 46 that is open at opposite axial ends through respective radially directed annular end walls 48, 50 of bobbin 38. Terminations of magnet wire that forms coil 42 are joined to respective electric terminals 52, 54 whose proximal ends are mounted on wall 48. Distal ends of these terminals project radially, passing through overmold 32 where they are laterally bounded by a surround 56, which is an integral formation of the overmold, so that the valve is provided with an electric connector for making connection to a complementary connector (not shown) leading to the management computer.

Solenoid assembly 30 further comprises magnetic circuit structure for concentrating magnetic flux generated by coil 40 when electric current is delivered to the coil via terminals 52, 54. The magnetic circuit structure comprises an armature 58 and a multi-part stator structure that comprises stator parts 60, 62, and 64.

Stator part 60 is a generally cylindrical pole piece that is disposed at one end of the solenoid assembly coaxial with axis 44. Stator part 62 is another pole piece that is disposed at the opposite end of the solenoid assembly coaxial with axis 44. Stator part 64 is a part that completes the magnetic circuit between the two stator pole piece parts 60, 62 exterior of the coil and bobbin. The magnetic circuit includes an air gap 65 between stator part 60 and armature 58; it also includes a gap between armature 58 and stator part 62 occupied by material of bobbin 38.

A portion of stator part 64 comprises a cylindrical wall 66 which is disposed coaxial with axis 44 and with which a head 67 of stator part 60 has a threaded engagement. Overmold 32 stops short of wall 66, comprising a cylindrical surround 32A, to allow external access to stator part 60. Head 67 comprises a tool engagement surface 68 that is accessible through surround 32A for engagement, and ensuing rotation, by a complementary shaped tool (not shown) to adjust the axial position of part 60 along axis 44. A portion of a shank of part 60 passes closely though one axial end of through-hole 46. A distal end portion of this shank comprises a shoulder 70 leading to a reduced diameter section 71 that ends in a tapered tip 72.

Armature 58 comprises a cylindrical shape adapted for axial motion within through-hole 46. One axial end of armature 58 is in juxtaposition to tip 72 of stator part 60 and comprises a nominally flat end surface in whose central region a tapered depression 74 is formed. This depression has a shape complementary to that of tip 72. At the bottom of depression 74 there is an impact absorbing cushion 76, such as an elastomer. Alternatively, cushion could be mounted on tip 72. The opposite axial end of armature 58 comprises a nominally flat end surface whose central region contains a blind circular hole 78 coaxial with axis 44. Radial clearance is provided between armature 58 and the wall of through-hole 46 to allow axial motion of the armature.

When acted upon by magnetic force arising from magnetic flux in the magnetic circuit, armature 58 will not necessarily move with solely an axial component of motion. The motion may be accompanied by a radial, or lateral, component. In order to attenuate undesired consequences, such as noise, resulting from such lateral motion, an impact absorbing cushion 80 is provided external to through-hole 46. The illustrated cushion 80 comprises an elastomeric ring circumscribing the armature, but without imposing any significant influence on desired axial motion of the armature. Cushion 80 is disposed on the inner margin of an annular mounting member 82 whose outer perimeter engages the wall of a counterbore 84 in bobbin end wall 50 to lodge the cushion-retainer assembly in place. Alternatively, cushion 80 and mounting part 82 may be separate parts arranged such that the latter holds the former in place.

A multi-part valve assembly 86 is assembled to armature 58. Assembly 86 comprises a valve head part 88 and a seal part 90. A force-balancing mechanism 92 is associated with valve assembly 86. Mechanism 92 comprises an annular convoluted diaphragm 94 and a retainer 96. The valve assembly and force-balancing mechanism are held in assembly relation with armature 58 by a fastener 98.

Head 88 is generally cylindrical but includes a radially protruding circular ridge 100 midway between its axial ends. Seal 90 comprises a ring-shaped circular body 102 with a groove 104 on its inside diameter providing for body 102 to fit onto the outside diameter of head 88 with ridge 100 lodging in groove 104. A frustoconical sealing lip 106 flares radially outward from the end of body 102 that is toward seat surface 29 to seal thereagainst when valve 14a is in the closed position shown in FIGS. 2 and 3.

Head 88 further comprises an external shoulder 108 at its axial end that is opposite sealing lip 106. Head 88 also comprises a central axially extending through-hole 110. The end of head 88 that is proximate sealing lip 106 comprises a series of circumferentially spaced fingers 111 directed radially inward of the through-hole.

Retainer 96 also has a generally cylindrical shape and comprises a central through-hole 112. The wall of this through-hole is fluted, comprising circumferentially spaced apart, axially extending flutes. Head 88 and retainer 96 are stacked together axially, and the stack is secured to armature 58 by fastener 98 having a press fit to armature 58. Fastener 98 is a hollow tube that has a head 113 and a shank 114. Head 113 bears against radially inner ends of fingers 111, but does not block passage through through-hole 110. Shank 114 passes through head 88 and retainer 96 and into force-fit with armature hole 78, causing retainer 96 to abut the end of the armature around hole 78. This secures valve assembly 86 to armature 58 so that the two move axially as one.

Retainer 96 further comprises a flange 116 that radially overlaps shoulder 108 of head 88. In assembly, flange 116 and shoulder 108 capture a bead 118 on the inner margin of diaphragm 94 to seal the I.D. of the diaphragm to the O.D. of valve assembly 86. The outer margin of diaphragm 94 comprises a bead 120 that is captured between confronting surfaces of bobbin end wall 50 and an internal shoulder 122 of body part 24. Counterbore 84 and member 94 cooperatively form an internal chamber space 126 as part of force-balancing mechanism 92.

A helical coil bias spring 130 is disposed about the distal end of part 60 with one of its axial ends bearing against a shoulder 70 of part 60 and its opposite end bearing against the flat end surface of armature 58 surrounding depression 74. When no electric current flows in coil 42, spring 130 forces lip 106 against seat surface 29. This closes the main flow passage through the valve between inlet port 25 and outlet port 26. Pressure at outlet port 26 is however communicated to chamber space 126 through a communication passage provided via the through-holes in head 88 and retainer 96. When the main flow passage is closed, it can be seen that tip 72 protrudes slightly into depression 74, creating a slight axial overlap between stator pole piece 60 and armature 58, but tip 72 is spaced from cushion 76.

The delivery of a purge control signal to valve 14a creates electric current flow in coil 42, and this current flow creates magnetic flux that is concentrated in the above-described magnetic circuit. As the current increases, increasing force is applied to armature 58 in the direction of increasingly displacing valve assembly 88 away from seat surface 29. This force is countered by the increasing compression of spring 130. The extent to which valve assembly 88 is displaced away from seat surface 29 is well-correlated with the current flow, and because of force-balancing and the sonic flow, the valve operation is essentially insensitive to varying manifold vacuum. The maximum displacement of armature 58 and valve assembly 86 away from seat surface 29 is defined by abutment of the tapered tip end of the armature with cushion 76.

In the operative emission control system 101, intake manifold vacuum is delivered through outlet port 26 and will act on the area circumscribed by the seating of lip 106 on seat surface 29. Absent force-balancing, varying manifold vacuum will vary the force required to open valve 14*a* and hence will cause the current flow in coil 42 that is required to open the valve to vary. Force-balancing de-sensitizes valve operation, initial valve opening in particular, to varying manifold vacuum. In valve 14*a*, force-balancing is accomplished by the aforementioned communication passage through valve assembly 86 to chamber space 126. By making the effective area of the movable wall portion of the chamber space that is formed by diaphragm 94 and valve assembly 86 equal to the area circumscribed by the seating of lip 106 on seat surface 29, the force acting to resist unseating of the closed valve assembly 88 is nullified by an equal force acting in the opposite axial direction. Hence, valve 14*a* is endowed with a well-defined and predictable opening characteristic which is important in achieving a desired control strategy for canister purging. Although once valve assembly 86 has unseated from seating surface 29, some counter-force continues to be exerted on it by the force-balance mechanism. Generally speaking, the counter-force will progressively diminish along a gradient.

Once the valve has opened beyond an initial unseating transition, sonic nozzle structure 28 becomes effective as a true sonic nozzle (assuming sufficient pressure differential between inlet and outlet ports) providing sonic purge flow and being essentially insensitive to varying manifold vacuum. Assuming that the properties of the vapor being purged, such as specific heat, gas constant, and temperature, are constant, mass flow through the valve is a function of essentially only the pressure upstream of the sonic nozzle. The restriction between the valve element and the valve seat upon initial valve element unseating and final valve element reseating does create a pressure drop preventing full sonic nozzle operation, but because these transitions are well-defined, and of relatively short duration, actual valve operation is well-correlated with the actual purge control signal applied to it. The valve is well-suited for operation by a pulse width modulated (PWM) purge control signal waveform from engine management computer 22 composed of rectangular voltage pulses having substantially constant voltage amplitude and occurring at selected frequency.

The constructions of valve assembly 86 and force-balancing mechanism 92 are advantageous. Although the materials of valve head 88, diaphragm 94 and seal 90 are polymeric, they may have certain diverse characteristics. Seal 90 may have a characteristic that allows it to be molded directly onto valve head 88. Such compatibility may not exist between the material of diaphragm 94 and valve head 88. Hence retainer 96, its stacked association with valve head 88, and the use of fastener 98, as herein disclosed, provides a construction that accomplishes the required sealing of both the diaphragm and the seal element to the valve head.

Once all the internal parts of valve 14*a* have been assembled to body part 24, overmold 32 is created to complete the enclosure. The overmold is created by known injection molding techniques. At joint 34 the overmold material seals to body part 24. Similar sealing occurs around terminals 52, 54. Overmold material encloses the entire side of solenoid 30. At the base of wall 32A overmold material also forms a seal, but leaves access to stator part 60. Stator part 60 provides for proper calibration of the valve by setting the start to open point in relation to a certain current flow in coil 42.

The combination of various features provides a valve that has improved noise attenuation, durability, and performance. The taper angles of tip 72 and depression 74 have been found to influence the force vs. current characteristic of solenoid 30. It has been discovered that taper angles of about 30° relative to axis 44 improve low-voltage operation of valve 14*a* by lowering the "pull in" voltage and improving the low flow, start-to-open characteristic of the valve. For example, initial flow upon valve opening has been reduced from about 2 SLPM to about 1.5 SLPM by incorporation of the taper.

Figure 6:
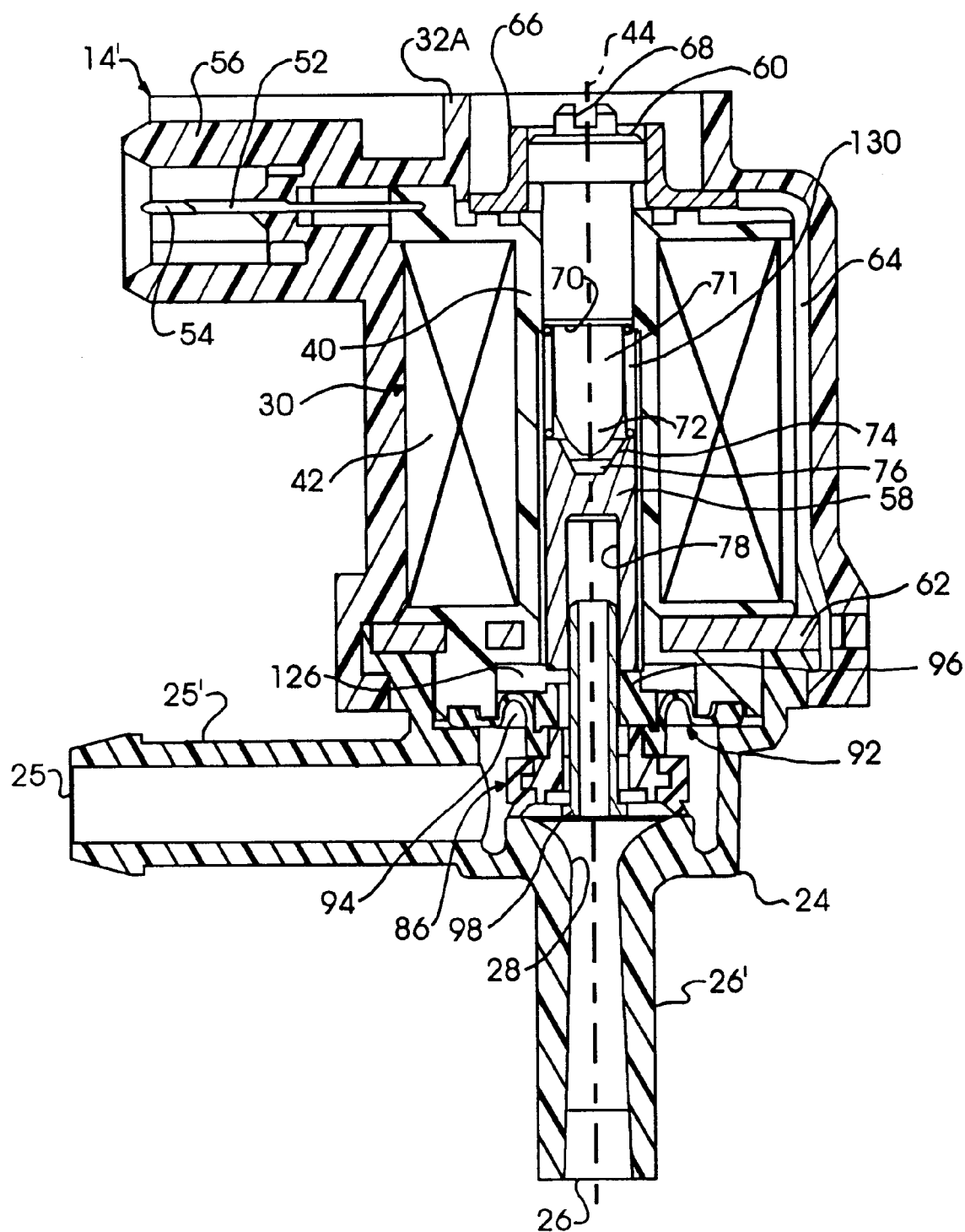
FIG. 6 is a view similar to FIG. 2, but showing another embodiment.
Figure 7:
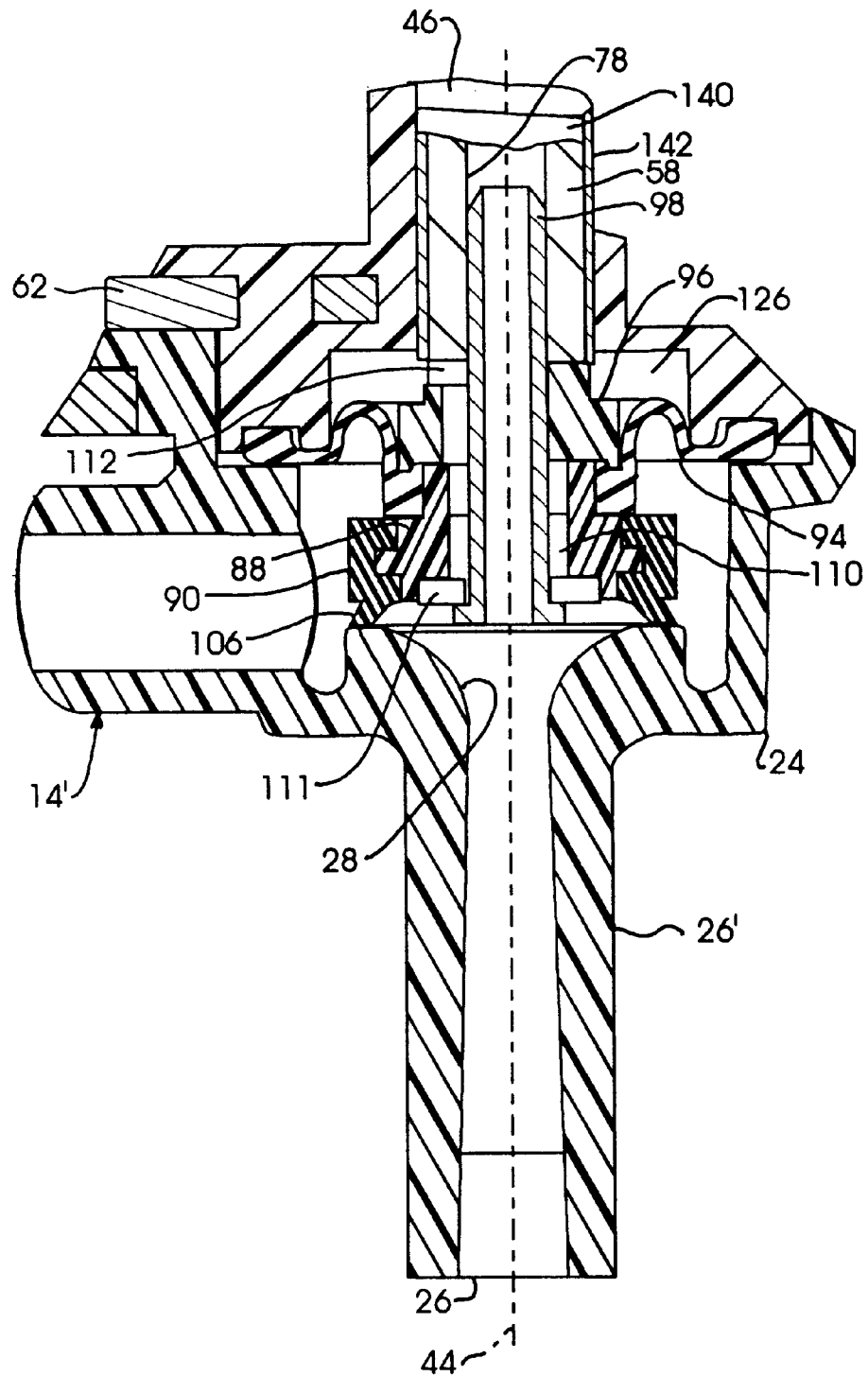
FIG. 7 is an enlarged fragmentary view of a portion of FIG. 6.

Another embodiment of valve is designated generally by the reference numeral 14' in FIGS. 6–7 and like parts of both valves 14*a*, 14' are designated by like reference numerals. Valve 14' is like valve 14*a* except that cushioning of lateral components of armature motion is provided by a different construction. Instead of employing cushion 80 and member 82, the combination of a circular cylindrical sleeve 140 and liner 142 is provided. Sleeve 140 is preferably a non-magnetic thin-walled metal within which armature 58 has a close, but low-friction, sliding fit. Liner 142 is preferably an viscoelastic material that is disposed between sleeve 140 and the wall of bobbin through-hole 46. The sleeve and liner are disposed within through-hole 46, preferably at least co-extensive with the length of armature 58 that is within the through-hole. It may be desirable to bond liner 142 to sleeve 140 so that the two form a single part that can be assembled into the valve during fabrication of the valve. Although not specifically illustrated by a separate drawing Fig., both forms of lateral armature cushioning could be incorporated into a valve, if appropriate for a particular usage.

Figure 8:
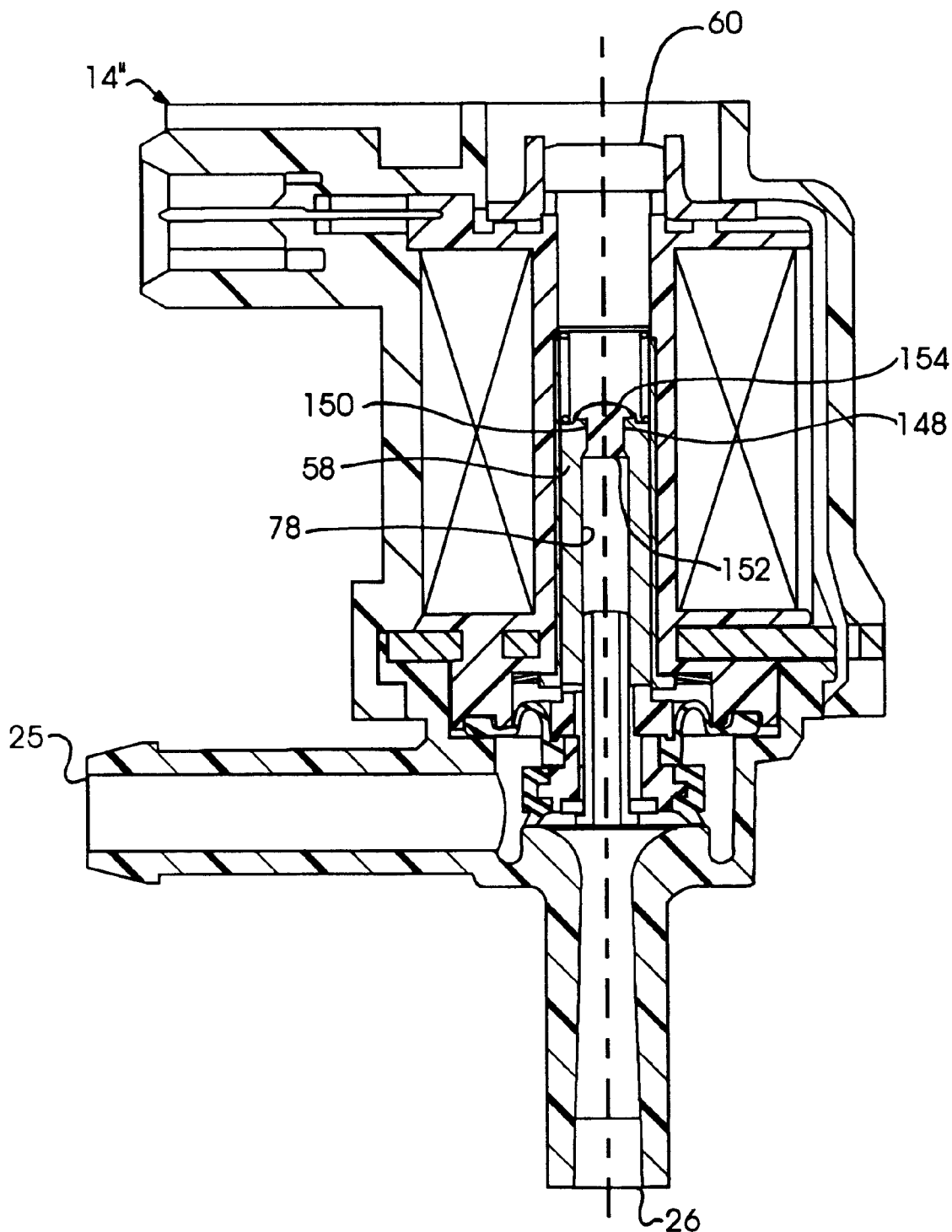
FIG. 8 is a view similar to FIG. 2, but showing another embodiment.

The embodiment of valve 14" in FIG. 8 is like the first embodiment except that the interface between stator part 60 and armature 58 is different. In valve 14" stator part 60 has a flat distal end instead of a tapered one. The juxtaposed end of armature 58 comprises a hole 148 that extends to, but is of slightly smaller diameter than, hole 78. A cushion 150 is mounted on this end of the armature, having a stem 152 fitting to hole 148, and a mushroom-shaped head 154 confronting the flat distal end of stator part 60. This valve shows the incorporation of both types of lateral impact cushioning, namely ring 84 and the sleeve-liner 140, 142.

As shown by FIGS. 1A and 2A, valve 14*a* mounts on manifold 18 in a receptacle space that is provided by a walled receptacle WR. Receptacle WR may be considered as comprising a bottom wall BW in the form of an integral multi-shouldered depression of manifold wall MW and two diametrically opposite upstanding receptacle wall formations WR1 and WR2. Assembly of the valve into the receptacle space is performed by initially inserting the lower end of the valve into the open upper end of the receptacle space and then advancing the valve downward. The two upstanding wall formations WR1 and WR2 are shown to be integral formations of manifold wall MW which are shaped to provide confronting grooves. Diametrically opposite sides of valve body 24 are formed to fit closely in these grooves as the valve is being inserted. FIG. 1A shows the valve being retained by catches RF1. These catches are at the upper ends of cantilevers that are integral formations of the valve body. Each receptacle wall formation WR1, WR2 contains a window WIN a short distance below its upper edge. The portion of each wall formation above its window WIN is designated RF2. As the valve body is being inserted into the receptacle space, a surface RF1' of a catch comes into interference with an inner upper end edge RF2' of a wall formation portion RF2. Increasing insertion increasingly flexes the cantilevers inward until the valve body has been fully inserted whereupon the cantilevers relax outward to lodge the catches in windows WIN, placing them in interference with the upper edges of the windows. At the final installed position the valve, a shoulder SH3 of valve body 24 is in juxtaposition to a shoulder SH1 of bottom wall BW, and a shoulder SH4 of the valve body is in juxtaposition to a shoulder SH2 of the bottom wall. Also a lip L' of a lip seal member SE that is around nipple 26' engages a frustoconical surface at the juncture of shoulder SH2 and the upper end of opening MWO through which the nipple has passed. This provides a gas-tight seal of the nipple side wall to the manifold wall proximate opening MWO.

Figure 9:
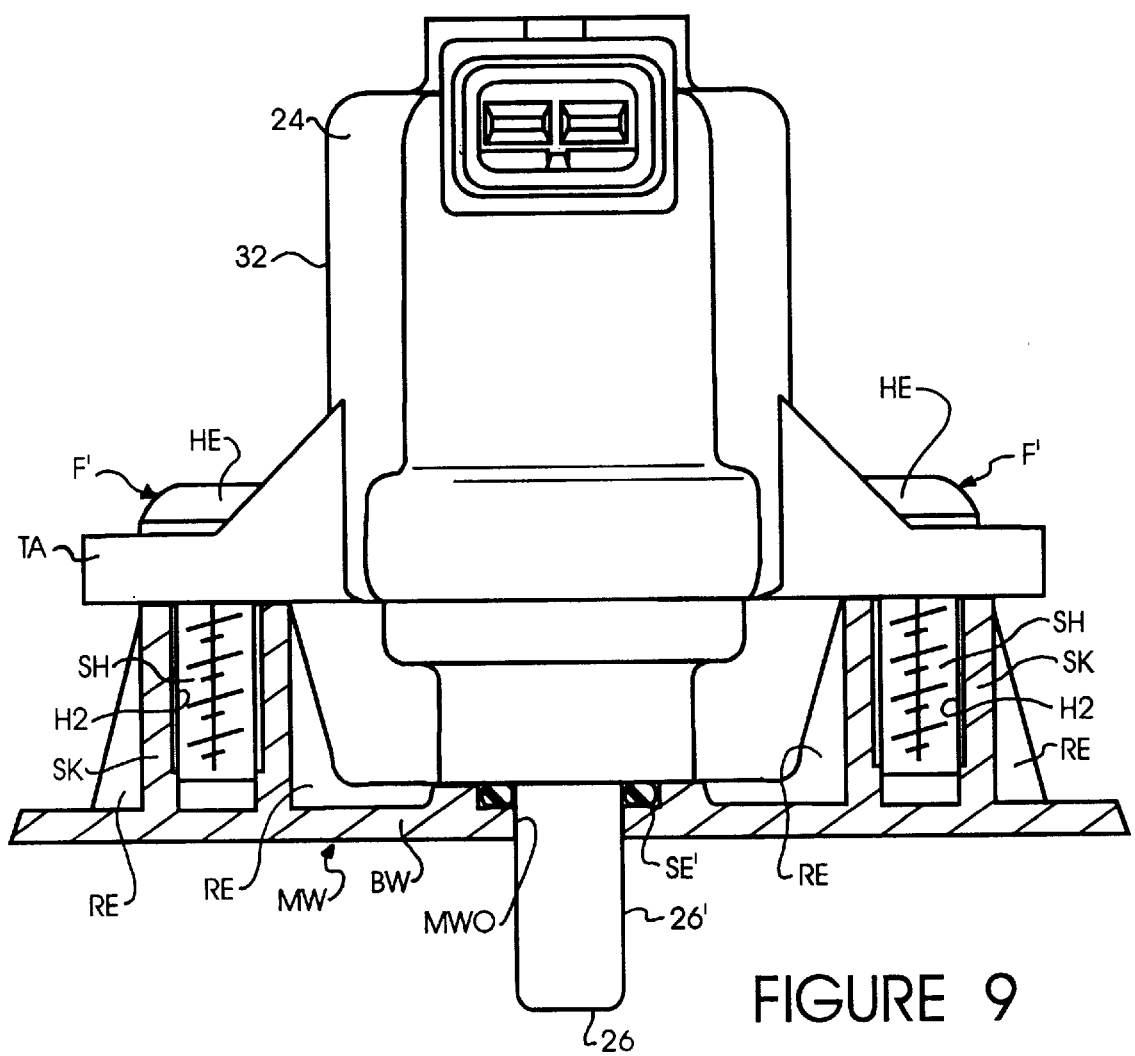
FIG. 9 shows a modified form of the emission control valve of FIG. 2 and mounting on a manifold.
Figure 10:
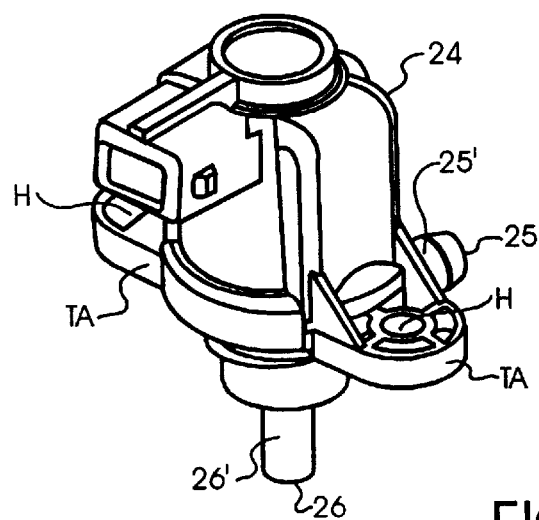
FIG. 10 shows a perspective view of the valve of FIG. 9 by itself on a reduced scale from that of FIG. 9.

FIGS. 9 and 10 shows another embodiment of purge valve and mounting that differs from the FIG. 1A embodiment in the mounting arrangement on the manifold. The mounting arrangement of FIGS. 9 and 10 includes formations, in the form of tabs, TA that are integral formations of the overmold 32 of valve body 24 and contain holes H. Fasteners F' pass through holes H to retain the valve body 24 on the manifold wall MW. Fasteners F' a comprise screws having heads HE and threaded shanks SH passing through holes H to engage blind holes H2 which are contained in walled sockets SK on the manifold wall MW. The walled sockets SK are integral formations of manifold wall MW and comprise tubular walls that are externally reinforced by integral reinforcement formations RE of manifold wall MW. The internal mechanism of the valve of FIGS. 9 and 10 is like that of valve 14a. Nipple 26' that contains outlet port 26 is a cylindrical tube onto which is placed an O-ring seal SE'. The seal is compressed axially, as shown in FIG. 9, to seal between the nipple and opening MWO. The receptacle bottom wall BW is planar, unlike the multi-shouldered bottom wall of the earlier embodiment.

III.) DETAILED DESCRIPTION OF EEGR VALVE OF FIGS. 1 AND 1A WITH REFERENCE TO FIGS. 11–20

Figure 11:
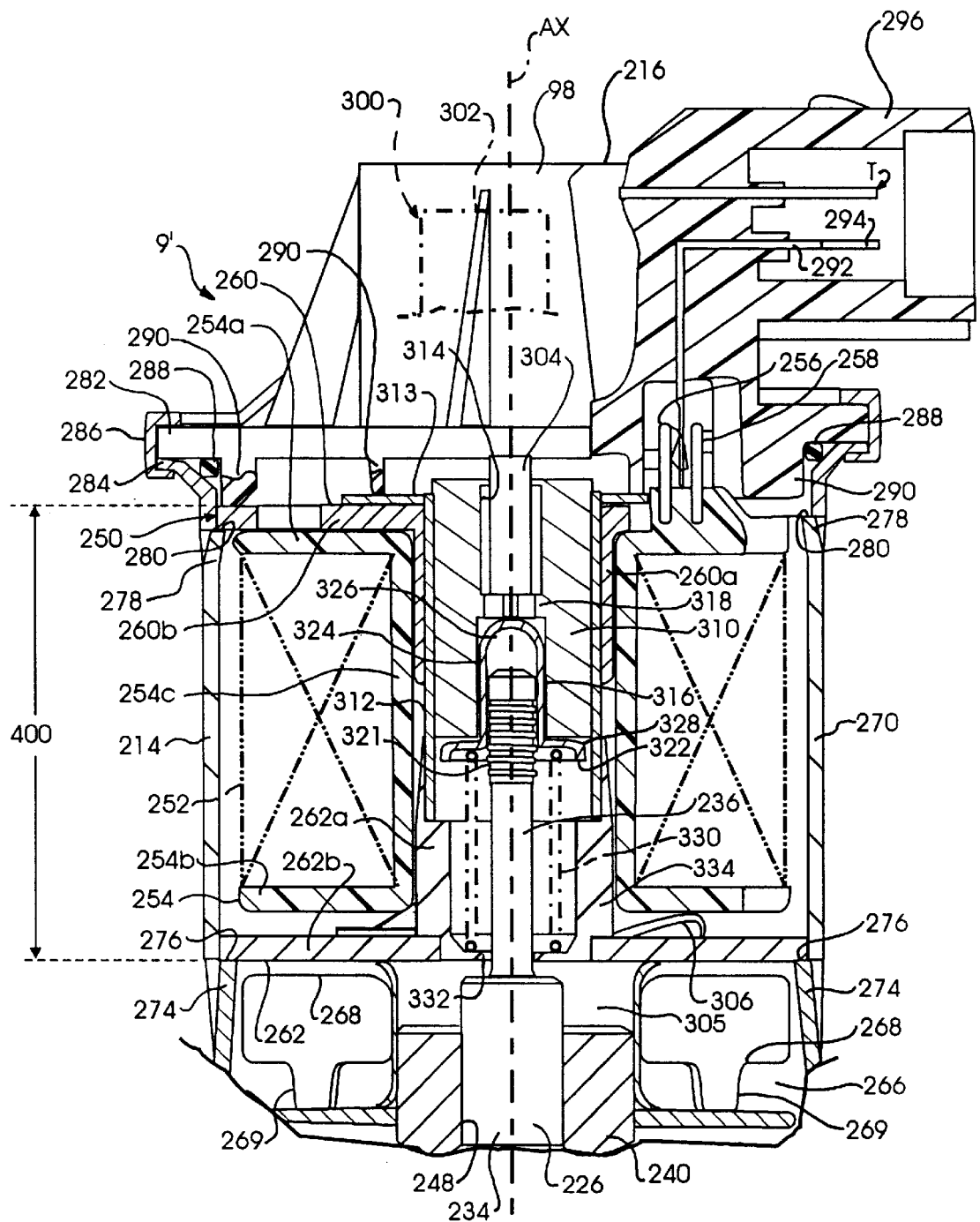
FIG. 11 is an enlarged view, mainly in cross section, of an electromagnetic actuator of the second of the emission control valves shown in FIG. 1A.
Figure 12:
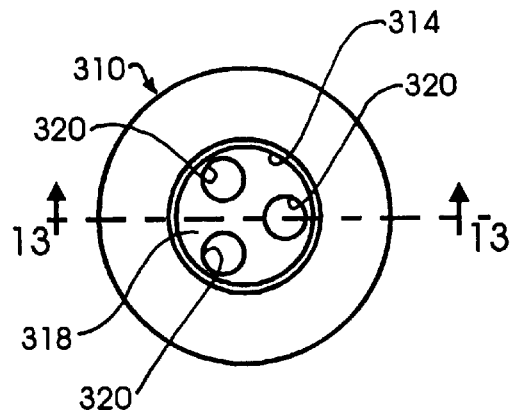
FIG. 12 is a top plan view of one of the parts of the actuator of FIG. 11 shown by itself on an enlarged scale, namely an armature.
Figure 13:
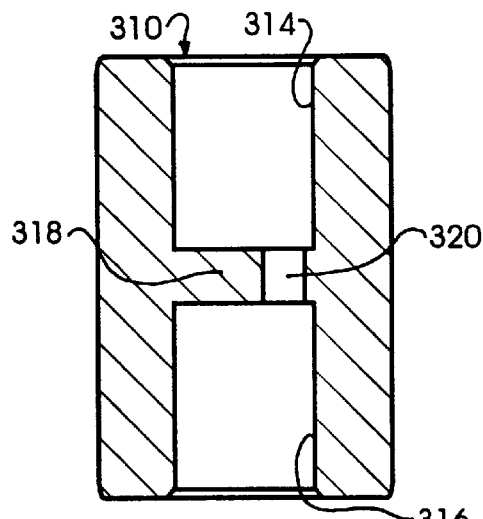
FIG. 13 is a cross-sectional view taken in the direction of arrows 13—13 in FIG. 12.

The internal construction of valve 9' is disclosed in FIGS. 1A and 11–14, with FIGS. 1A and 11 showing an imaginary axis AX. Valve 9' comprises a housing assembly that includes several parts assembled together. One part is a shell 214 having an open upper end that is closed by a cap 216. Parts CM, T1, and CP2, which appear in FIGS. 1A and will be described more fully hereinafter, are additional parts of the housing assembly.

As shown by FIG. 1A, the assembly provides a main internal exhaust gas passage 218 that contains an entrance, or inlet port, 220 coaxial with axis AX and an exit, or outlet port, 222 comprising a plurality of holes. Entrance 220 is communicated by a conduit (not shown) to receive engine exhaust gases, and exit 222 is disposed within manifold space MS to deliver engine exhaust gases received at entrance 220 into manifold space MS.

A valve seat 224a is disposed in passage 218 coaxial with entrance 220. Valve seat 224 has an annular shape comprising a through-hole having a frusto-conically tapered seat surface 224a extending around its inner margin. A one-piece, non-flow-through valve member 226 is coaxial with axis AX and comprises a non-flow-through valve head 228 and a valve stem, or valve shaft, 230 extending co-axially from head 228. Head 228 is shaped for cooperation with seat 224 by having an outer perimeter that is shaped to include a frusto-conical tapered surface 228a that has full circumferential contact with seat surface 224a when the valve is in closed position shown in FIG. 1A. Stem 230 comprises a first circular cylindrical segment 232 extending from head 228, a second circular cylindrical segment 234 extending from segment 232, and a third circular cylindrical segment 236 extending from segment 234. It can be seen that segment 234 has a larger diameter than either segment 232, 236. Valve member 226 is shown as a one-piece structure formed from a homogeneous material. Thus the illustrated valve member 226 is a monolithic structure. Alternatively, valve member 226 can be fabricated from two or more individual parts assembled integrally to form a one-piece valve member structure.

Valve 9' further comprises a bearing member 240 which is basically a circular cylindrical member except for a circular flange 242 intermediate its opposite axial ends. An upper rim flange of a multi-shouldered deflector member 246 is axially captured between flange 242 and lanced tabs 246a. Deflector member 246 is a metal part shaped to circumferentially bound a portion of bearing member 240 below flange 242 and a portion of stem segment 232 extending from segment 234. Deflector member 246 terminates a distance from valve head 228 so as not to restrict exhaust gas flow through passage 218, but at least to some extent deflect the gas away from stem 230 and bearing member 240.

Bearing member 240 further comprises a central circular through-hole, or through-bore, 248 with which stem segment 234 has a close sliding fit. Bearing member 240 comprises a material that possesses some degree of lubricity providing for low-friction guidance of valve member 226 along axis AX.

Valve 9' further comprises an electromagnetic actuator 250, namely a solenoid, disposed within shell 214 coaxial with axis AX. Actuator details are shown on a larger scale in FIGS. 11–14. Actuator 250 comprises an electromagnetic coil 252 and a polymeric bobbin 254. Bobbin 254 comprises a central tubular core 254c and flanges 254a, 254b at opposite ends of core 254c. Coil 252 comprises a length of magnet wire wound around core 254c between flanges 254a, 254b. Respective terminations of the magnet wire are joined to respective electric terminals 256, 258 mounted on flange 254a.

Actuator 250 comprises stator structure associated with coil 252 to form a portion of a magnetic circuit path. The stator structure comprises an upper pole piece 260, disposed at one end of the actuator coaxial with axis AX, and a lower pole piece 262 disposed at the opposite end of the actuator coaxial with axis AX. A portion of the wall of shell 214 that extends between pole pieces 260, 262 completes the stator structure exterior of the coil and bobbin.

An annular air circulation space 266 is provided within shell 214 axially below actuator 250. This air space is open to the exterior by several air circulation apertures, or through-openings, 268 extending through shell 214. Shell 214 comprises a side wall 270 co-axial with axis AX and an end wall 272 via which the shell mounts on a central region of part CM, which forms a portion of the mounting for the valve on the manifold. Each hole 268 has a lower edge that is spaced from end wall 272 except for the inclusion of an integral drain 269 (see FIG. 1A) that is disposed centrally along the circumferential extent of each hole and that extends to end wall 272. This enables any liquid that may accumulate on end wall 272 within space 266 to drain out of the space by gravity, and in the process maintains substantial integrity between side wall 270 and end wall 272.

Side wall 270 has a slight taper that narrows in the direction toward end wall 272. In the portion of the shell side wall that bounds space 266, several circumferentially spaced tabs 274 are lanced inwardly from the side wall material to provide rest surfaces 276 on which lower pole piece 262 rests. Proximate its open upper end, the shell side wall contains similar tabs 278 that provide rest surfaces 280 on which upper pole piece 260 rests. Cap 216 comprises an outer margin 282 that is held secure against a rim 284 at the otherwise open end of shell side wall 270 by a clinch ring 286. A circular seal 288 is disposed between the cap and shell to make a sealed joint between them. The interior face of cap 216 comprises several formations 290 that engage upper pole piece 260 to hold the latter against rests 280 thereby axially locating the upper pole piece to the shell. Cap 216 comprises a first pair of electric terminals 292, 294 that mate respectively with terminals 256, 258. Terminals 292, 294, protrude from the cap material where they are bounded by a surround 296 of the cap material to form a connector adapted for mating connection with a wiring harness connector (not shown) for connecting the actuator to an electric control circuit.

Cap 216 also comprises a tower 298 see FIG. 11 providing an internal space for a position sensor 300. Sensor 300 comprises plural electric terminals, designated generally by the reference T, that extend from a body 302 of sensor 300 to protrude into the surround 296 for connecting the sensor with a circuit. Sensor 300 further comprises a spring-biased sensor shaft, or plunger, 304 that is coaxial with axis AX.

The construction of valve 9' is such that leakage between passage 218 and air circulation space 266 is prevented. Bearing member through-hole 248 is open to passage 218, but valve stem section 234 has a sufficiently close sliding fit therein to substantially occlude the through-hole and prevent leakage between passage 218 and air circulation space 266 while providing low-friction guidance of the stem and enabling the pressure at outlet port 222 to act on the cross-sectional area of stem section 234. Within space 266, a deflector 305 circumferentially bounds the portion of the stem that passes through the space. The construction of deflector 305 is shown in FIG. 11 to comprise a circular cylindrical thin-walled member whose opposite axial ends are flared to engage lower pole piece 262 and shell end wall 272 respectively thus forming a barrier that prevents air in the air circulation space from reaching the stem. The lower end portion of deflector 305 is shown to fit closely around the upper end portion of bearing member 240 which stops short of lower pole piece 262 so that in the absence of the deflector the stem would be directly exposed to foreign material, muddy water for example, that might enter space 266. In FIG. 1A, the deflector has a different shape, and does not extend to wall 272.

Upper pole piece 260 is a one-part piece that comprises a central cylindrical-walled axial hub 260a and a radial flange 260b at one end of hub 260a. Flange 260b has an opening that allows for passage of terminals 256, 258 through it. Hub 260a is disposed co-axially within the upper end of the through-hole in bobbin core 254c, with bobbin flange 254a disposed against flange 260b. This axially and radially relates the bobbin and the upper pole piece.

Lower pole piece 262 comprises a two-part construction composed of a central hub part 262a and a rim part 262b that are joined together to form a single piece. An annular wave spring 306 is disposed around hub 262a and between rim 262b and bobbin flange 254b, and maintains bobbin flange 254a against flange 260b. Therefore, a controlled dimensional relationship between the two pole pieces and the bobbin-mounted coil is maintained which is insensitive to external influences, such as temperature changes.

Actuator 250 further comprises an armature 310 that in cooperation with the stator structure completes the actuator's magnetic circuit path. Additional detail of the armature appears in FIGS. 12 and 13. Armature 310 comprises a unitary ferromagnetic cylinder that is guided within a surrounding thin-walled, non-magnetic, cylindrical sleeve 312 that extends between the hubs of pole pieces 260 and 262 within the bobbin core through-hole. The upper end of sleeve 312 contains a flange 313 that is captured between cap 216 and pole piece 260 to secure the sleeve in place. Armature 310 has opposite axial end surfaces that are perpendicular to axis AX. A respective walled circular hole 314, 316 extends from a respective end surface into the armature coaxial with axis AX. Within the armature, the inner ends of these holes 314, 316 are separated by a transverse wall 318 of the armature. A series of circular holes 320 (see FIGS. 12 and 13) that are centered at 120° intervals about the armature axis extend through wall 318 between the two holes 314, 316.

Stem segment 236 comprises a free distal end portion containing a zone having a series of circumferentially extending serrations, or barbs, 321. A locator member 322 is disposed on and secured to this free distal end portion of stem segment 236. Locator member 322 comprises a cylindrical side wall 324 having a hemispherical dome 326 at one axial end and a rimed flange 328 at the other. The locator member is secured to the valve stem by locally deforming side wall 324 onto at least some of barbs 321. Dome 326 is disposed within hole 316 to bear against wall 318. Rimmed flange 328 is external to hole 316 to provide a seat for one axial end of a helical coil spring 330 that is disposed about stem section 236. The opposite end of spring 330 seats on a surface of an end wall 332 of hub 262a.

Figure 14:
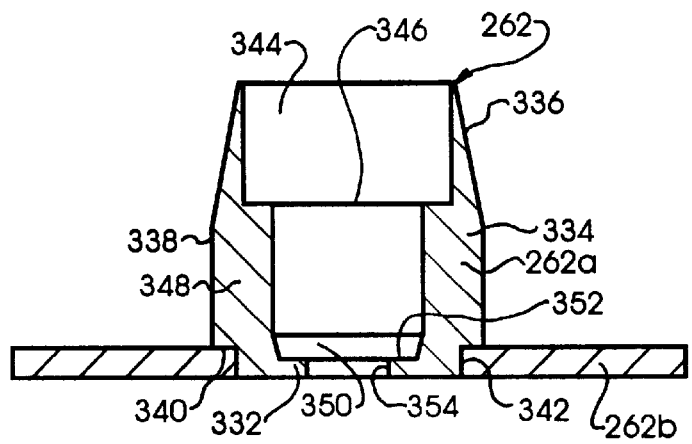
FIG. 14 is an enlarged cross-sectional view of another of the parts of the actuator of FIG. 11 shown by itself on a slightly enlarged scale, namely a lower pole piece.

As shown in FIG. 14, hub 262a of lower pole piece 262 comprises a machined part that comprises an axially extending side wall 334 in addition to end wall 332. Side wall 334 has a radially outer surface profiled to comprise in succession from one end to the other, a frusto-conical taper 336, a circular cylinder 338, an axially facing shoulder 340, and a circular cylinder 342 of reduced diameter from that of cylinder 338. Side wall 334 has a radially inner surface profiled to comprise in succession from one end to the other, a circular cylinder 344, an axially facing shoulder 346, a circular cylinder 348 of reduced diameter from that of cylinder 344, a chamfer 350, an axially facing shoulder 352, and a circular cylinder 354 of reduced diameter from that of cylinder 348.

Hub part 262a is symmetric about a central axis that is coincident with axis AX. Its inner and outer profiles are surfaces of revolution. The part has an upper axial end which comprises a tapered section that narrows in the direction away from the lower axial end. This tapered section comprises taper 336, which is non-parallel with the central axis of the hub part, and cylinder 344, which is parallel with the central axis of the hub part. Shoulder 346 adjoins cylinder 344 of the tapered section. Chamfer 350 is axially spaced from shoulder 346 by cylinder 348 and bounds shoulder 352 to cooperate therewith in locating the lower end of spring 330 on the lower pole piece.

Lower pole piece rim 262b comprises a stamped metal ring, or annulus, having circular inside and outside diameters and uniform thickness. The inside diameter (I.D.) and thickness are chosen to provide for a flush fit to the lower end of hub 262a, with the ring's I.D. fitting closely to surface 342 and the margin that surrounds the I.D. bearing against shoulder 340. The axial portion of the hub part comprising surface 342 thus forms a neck extending from shoulder 340. The axial dimension of the ring is preferably substantially equal to the axial dimension of cylinder 342 to provide the flush fit. The two pieces are secured together at this location preferably by a force-fit of the ring's I.D. to cylinder 354 of the hub, which may be reinforced by staking. When appropriate, the outside diameter (O.D.) of rim part 262b can be trued by turning of the joined hub and rim. The rim part is fabricated by punching it out of metal strip stock. By having a two-part, rather than a one-part construction, for the lower pole piece, less scrap is generated than if the pole piece were to be machined from a single rough part. The upper pole piece could also be made like manner from two separate parts.

FIGS. 1A and 11 show the closed position of valve 9' wherein spring 330 is pre-loaded, forcing valve head surface 228a seated closed against seat surface 224a. Accordingly, flow through passage 218 between ports 220 and 222 is blocked. The effect of spring 330 also biases dome 326 of locator member 322 into direct surface-to-surface contact with transverse wall 318 of armature 310. Thus, a single load operative connection is formed between armature 310 and locator member 322. The nature of such a connection provides for relative pivotal motion between the two such that force transmitted from one to the other is essentially exclusively axial. The spring bias provided by position sensor 300 also causes sensor shaft 304 to be biased into direct surface-to-surface contact with the surface of wall 318 opposite the surface with which locator member dome 326 is in contact.

As electric current begins to increasingly flow through coil 252, the magnetic circuit exerts increasing force urging armature 310 in the downward direction as viewed in FIGS. 1A and 11. Once the force is large enough to overcome the bias of the pre-load force of spring 330, armature 310 begins to move downward, similarly moving valve member 226 because of the action of wall 318 on locator member 322. This unseats valve head 228 from seat 224, opening the valve to allow flow through passage 218 between ports 220 and 222. Sensor shaft 304 is maintained in contact with wall 318 to follow the motion. The extent to which the valve is allowed to open is controlled by the electric current in coil 252, and by tracking the extent of valve motion, sensor 300 provides a feedback signal representing valve position, and hence the extent of valve opening. The actual control strategy for the valve is determined as part of the overall engine control strategy embodied by the electronic engine control. Through-holes 320 that extend through wall 318 between holes 314 and 316 provide for the equalization of air pressure at opposite axial ends of the armature.

By providing for locator member 322 to be adjustably positionable on the free distal end of stem 236 before the two are joined, valve 9' can be effectively calibrated. The calibration can be performed either to set the position of the armature relative to the pole pieces, e. g. the overlap of the armature with the tapered end of the lower pole piece hub part, or to set the extent to which spring 330 is compressed when the valve is closed, i.e. the spring pre-load. The calibration is performed during the fabrication process before the coil and bobbin assembly 252, 254 and upper pole piece 260 have been assembled. At that time locator member 322 is positioned on the free distal end of the valve stem to its calibrated position. Once the locator member has been axially positioned on the stem to a position that provides calibration, locator member side wall 324 is fixedly joined to the stem by a procedure, such as crimping. Thereafter the remaining components of the solenoid are assembled.

When the valve is closed, the pressure (either positive or negative) of an operative fluid medium at port 222 acts on valve head 228 with a force in one direction; the same pressure simultaneously acts on valve stem segment 234 with a force in an opposite direction. Hence, the cross-sectional area of stem segment 234 and the cross-sectional area circumscribed by the contact of head surface 228a with seat surface 224a determine the direction and the magnitude of net force acting on valve member 226 due to pressure at port 222 when the valve is closed. Accordingly, there are various alternative arrangements, each of which can be employed in the valve.

First, making the cross-sectional area of stem segment 234 less than the cross-sectional area circumscribed by the contact of head surface 228a with seat surface 224a provides an embodiment of valve wherein the net force will occur in the direction of valve opening when the pressure is positive, and in the direction of valve closing when the pressure is negative.

Second, making these cross-sectional areas substantially equal provides another embodiment that is substantially fully force-balanced, meaning substantially insensitive to the pressure at port 222. In other words, by making the cross-sectional area that is circumscribed by the contact of valve head surface 228a with seat surface 224a substantially equal to the cross-sectional area of stem segment 234, as in commonly assigned U.S. Pat. No. 5,413,082, issued May 9, 1995, a full force-balancing effect is attained, making the valve substantially insensitive to varying induction system pressure, either positive or negative.

Third, making the cross-sectional area of stem segment 234 greater than the cross-sectional area circumscribed by the contact of head surface 228a with seat surface 224a provides still another embodiment wherein the net force will occur in the direction of valve closing when the pressure is positive, and in the direction of valve opening when the pressure is negative.

Once head 228 has unseated from seat 224 in any of these embodiments, valve member 226 may still be affected by pressures acting on head 228 and on stem segment 234, but the net effect may vary depending on several factors. One factor is the extent to which the valve is open. Another is whether the valve is constructed such that the valve head moves increasingly away from both the seat and the outlet port as it increasingly opens (as in the illustrated valve of FIG. 1A) or whether the valve head moves increasingly away from the valve seat, but toward the outlet port, as it increasingly opens.

In the illustrated embodiment of FIG. 1A, the area defined by the diameter across head surface 228a at its contact with seat surface 224a is somewhat larger than the cross-sectional area defined by the diameter of stem segment 234 in accordance with the first alternative described above. For example, that diameter of head surface 228a may be 10 mm., and that of stem segment 234, 8 mm. For negative pressures at port 222, this differential will yield a net force that acts in the direction of valve closing. This attribute may be beneficial in controlling the valve upon opening, specifically preventing the valve from opening more than an amount commanded by the electromagnetic actuator than if the difference between the diameters were smaller.

Because of its several features, valve 9' can be made dimensionally compact, yet still achieve compliance with relevant performance requirements. An example of the inventive valve which illustrates its beneficial compactness comprises an overall dimension (reference 400 in FIG. 11) of approximately 35 mm. as measured axially from upper pole piece 260 to lower pole piece 262 and a maximum diameter thereacross of approximately 51 mm. This compares with respective correlative dimensions of approximately 40 mm. and approximately 60 mm. for a prior valve having substantially the same flow capacity.

Part CM is a generally tubular part that is drawn from sheet metal stock, steel for example, and comprises a first end wall 500, a tubular side wall 502, and a second end wall 504. Side wall 502 is a circular cylindrical wall coaxial with axis AX. End wall 500 is a circular annular wall disposed perpendicular to and concentric with axis AX and directed radially outward from one end of side wall 502. End wall 504 is a circular annular wall disposed perpendicular to and concentric with axis AX and directed radially inward at the opposite end of side wall 502.

Part Ti is also a drawn metal part that comprises a circular cylindrical side wall 506 coaxial with axis AX and a circular annular wall 508 directed radially inward at one end of side wall 506. The opposite end of side wall 506 is open, thereby forming inlet port 220 of the valve.

Part CP2 is another drawn metal part in the shape of an inverted cup. It comprises a circular cylindrical side wall 510 coaxial with axis AX and a circular annular wall 512 directed radially inward at one end of side wall 510. The opposite end of side wall 510 is open, but surrounded by a circular rim 514.

Manifold wall MW comprises aligned openings 520, 522 in opposite wall portions, the former being larger than the latter. FIG. 1A shows part CM functioning as a closure member that closes opening 520 when the valve is in assembly with the manifold. Headed screws S1 fasten the perimeter margin of end wall 500 to the manifold, the screw shanks being passed through holes in wall 500 and threaded into blind holes provided by integral socket formations 524 of manifold wall MW. An annular sealing gasket 526 is included between end wall 500 and the margin of the manifold wall surrounding opening 520 to provide a gas-tight joint. Member CM and end wall 272 of EGR shell 214 have features FF that locate and secure the shell to part CM.

Likewise part CP2 functions to close opening 522, with headed screws S fastening rim 514 to the manifold wall in gas-tight fashion by passing the screw shanks through holes in manifold wall MW and threading them into extruded holes in rim 514.

Side wall 502 of part CM comprises lanced tabs 246a for locating bearing guide member 240 while cooperating therewith in sandwiching the upper rim of deflector 246 between them.

The three parts CM, CP2, and T1 are assembled together at walls 504, 508, and 512, which are sandwiched together and welded by welding W, as shown in FIG. 1A. Walls 504, 508, 512 contain aligned circular holes, with the hole in wall 508 providing seat surface 224a against which surface 228a of valve head 228 closes when the valve is closed. Part T1 is internally threaded at the open end of its side wall to provide for attachment of an exhaust gas conduit (not shown). Parts CP2 and T1 cooperatively provide an annular space AS that surrounds the outside of the latter tube, that protrudes through opening 522, and that extends to at least the edge of opening 522. This space AS is open to the exterior space ES.

Figure 15:
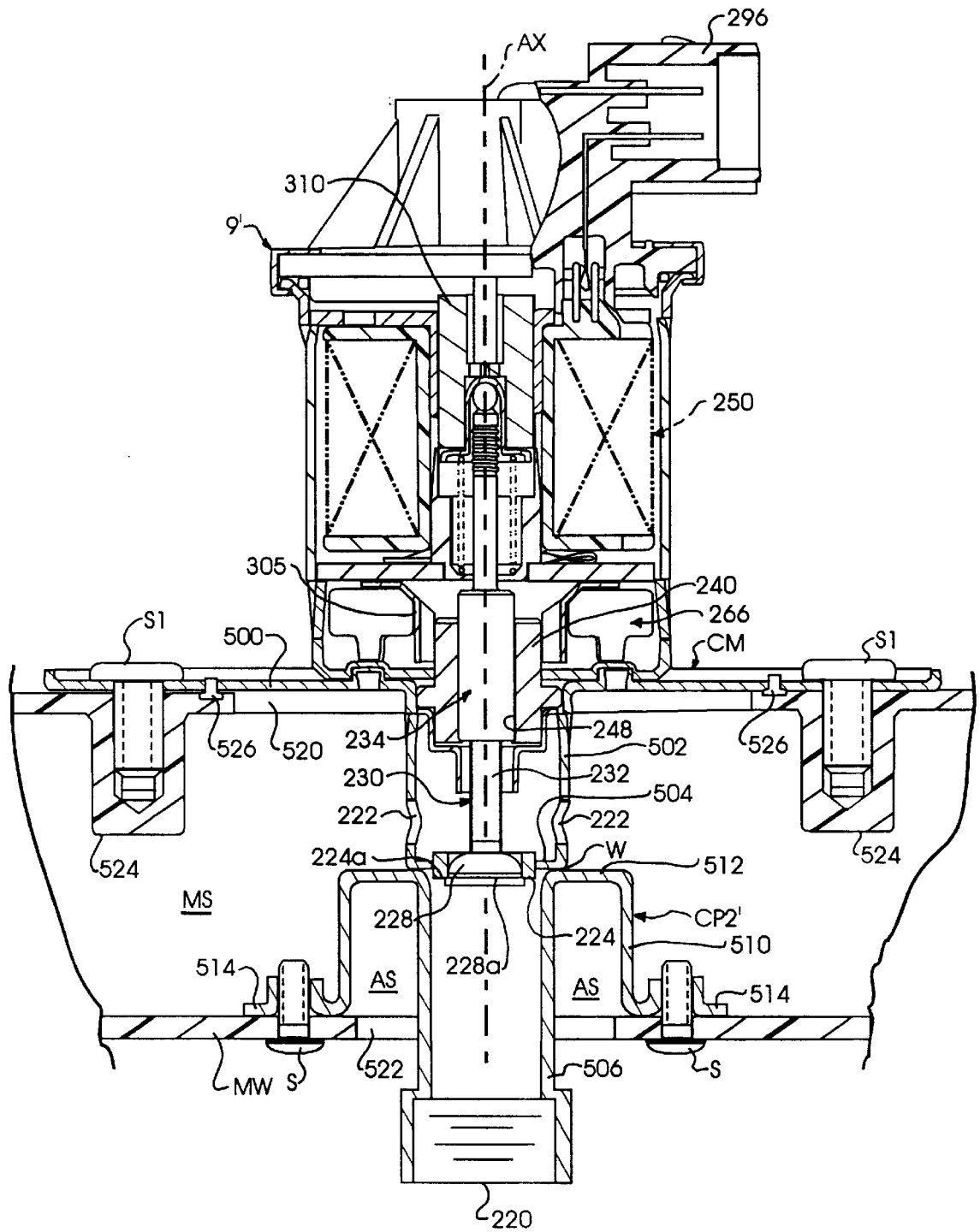
FIG. 15 shows a modified form of the second valve of FIG. 1A and mounting on a manifold.

FIG. 15 shows a further embodiment comprising the integration of parts T1 and CP2 to form a single part CP2'. Parts of the FIG. 15 embodiment that are like those of the FIG. 1A embodiment are identified by like reference numerals. The two parts CP2' and CM are welded together at W, and such welding W is performed to create a gas-tight joint in all valve embodiments shown herein. Valve seat 224 is a separate annular element 224 that is mounted in a hole in end wall 504 in gas-tight fashion. The integration of parts T1 and CP2 results in side wall 506 merging with wall 512 and the elimination of wall 508. Hence, welding occurs between only walls 504 and 512.

Figure 16:
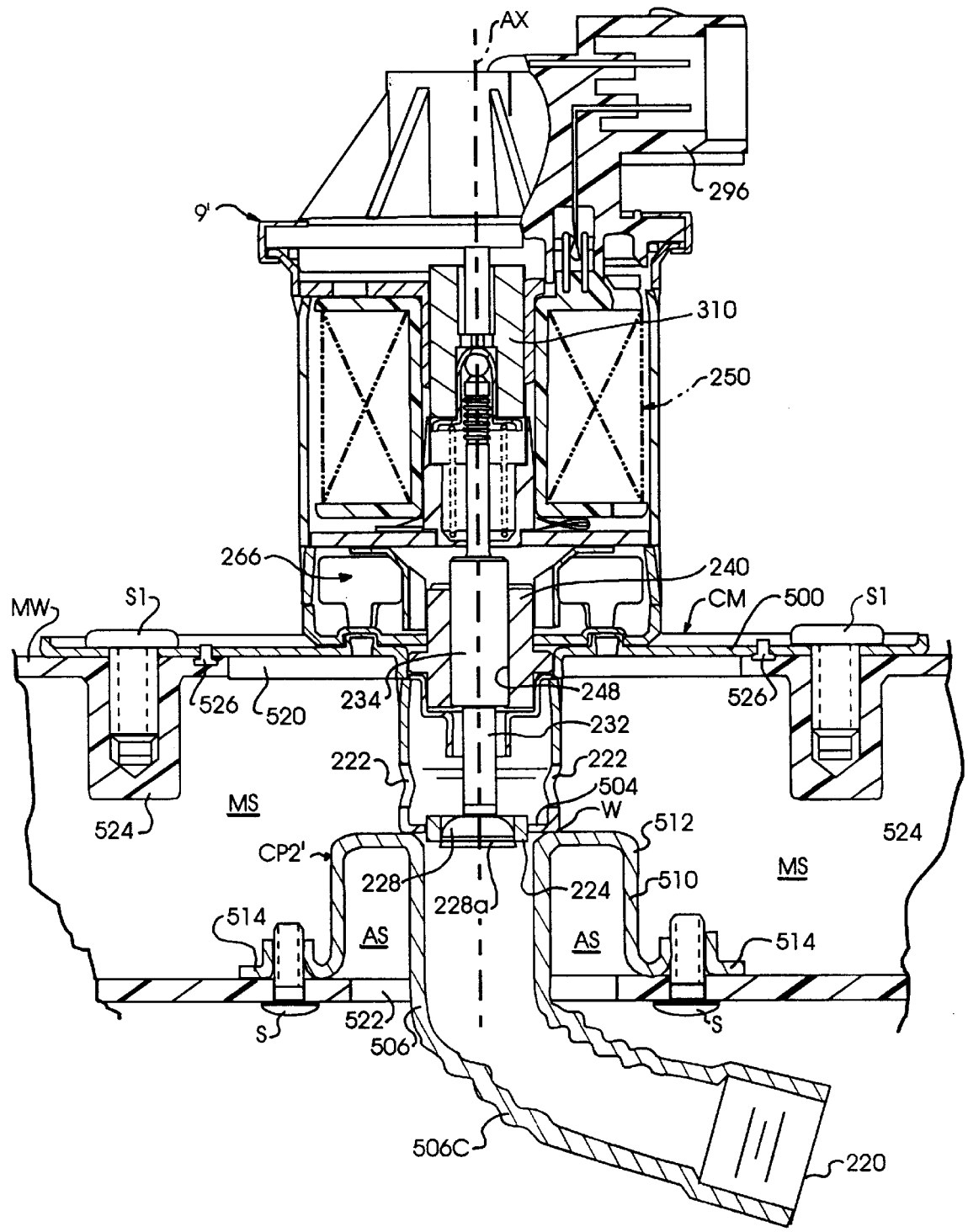
FIG. 16 shows a modified form of the second valve of FIG. 1A and mounting on a manifold.

FIG. 16 shows an embodiment like FIG. 15 except that side wall 506 comprises a corrugated segment 506c that allows it to be bent at an angle as shown.

Figure 17:
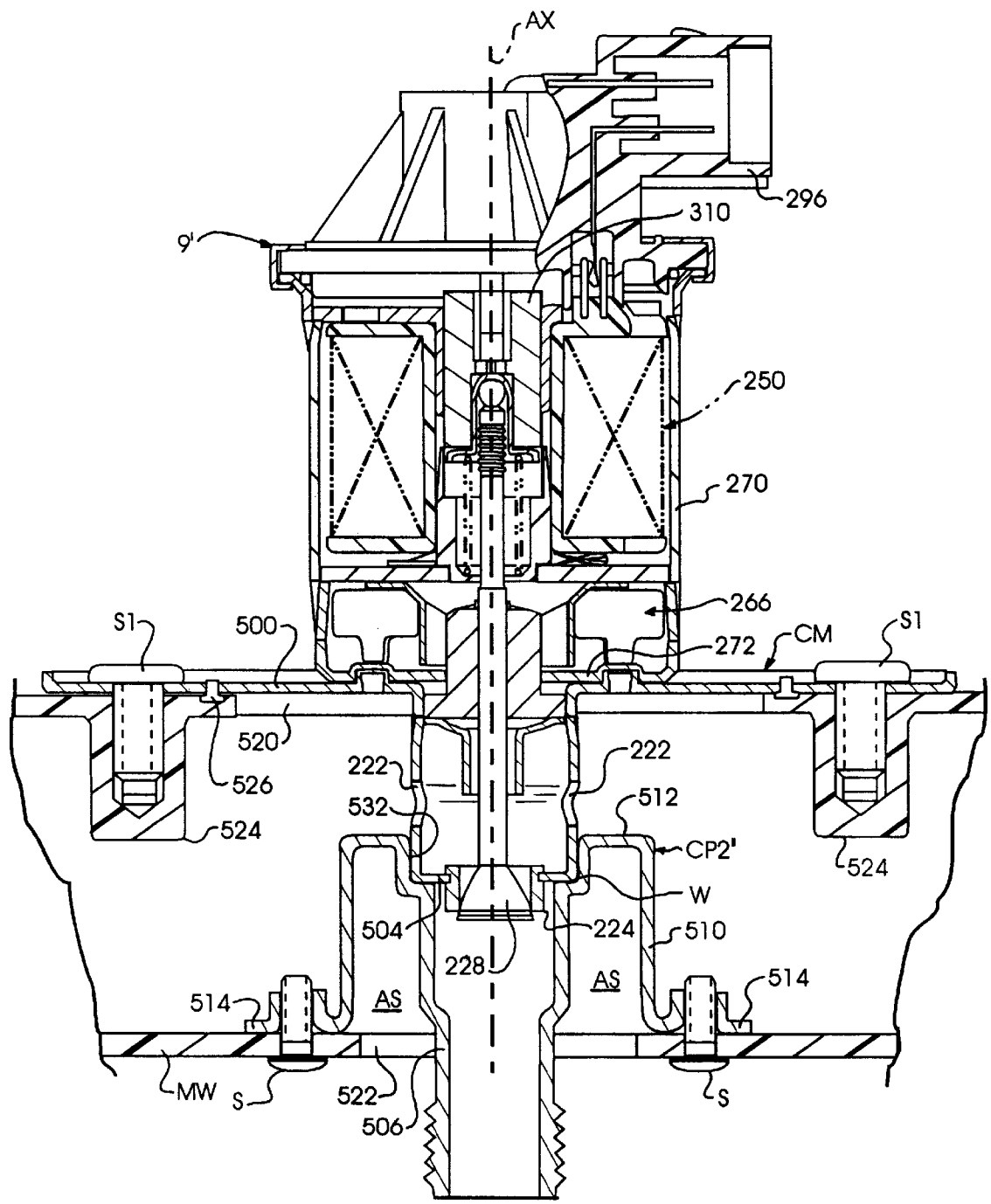
FIG. 17 shows a modified form of the second valve of FIG. 1A and mounting on a manifold.

FIG. 17 shows an embodiment in which a part CP2" that is similar to part CP2 has a circular walled depression 532 into which the end portion of side wall 502 that contains end wall 504 is received. The two parts are welded together at this location to be gas-tight. The inlet port has an external thread for attachment of an exhaust gas conduit (not shown) thereto.

Figure 18:
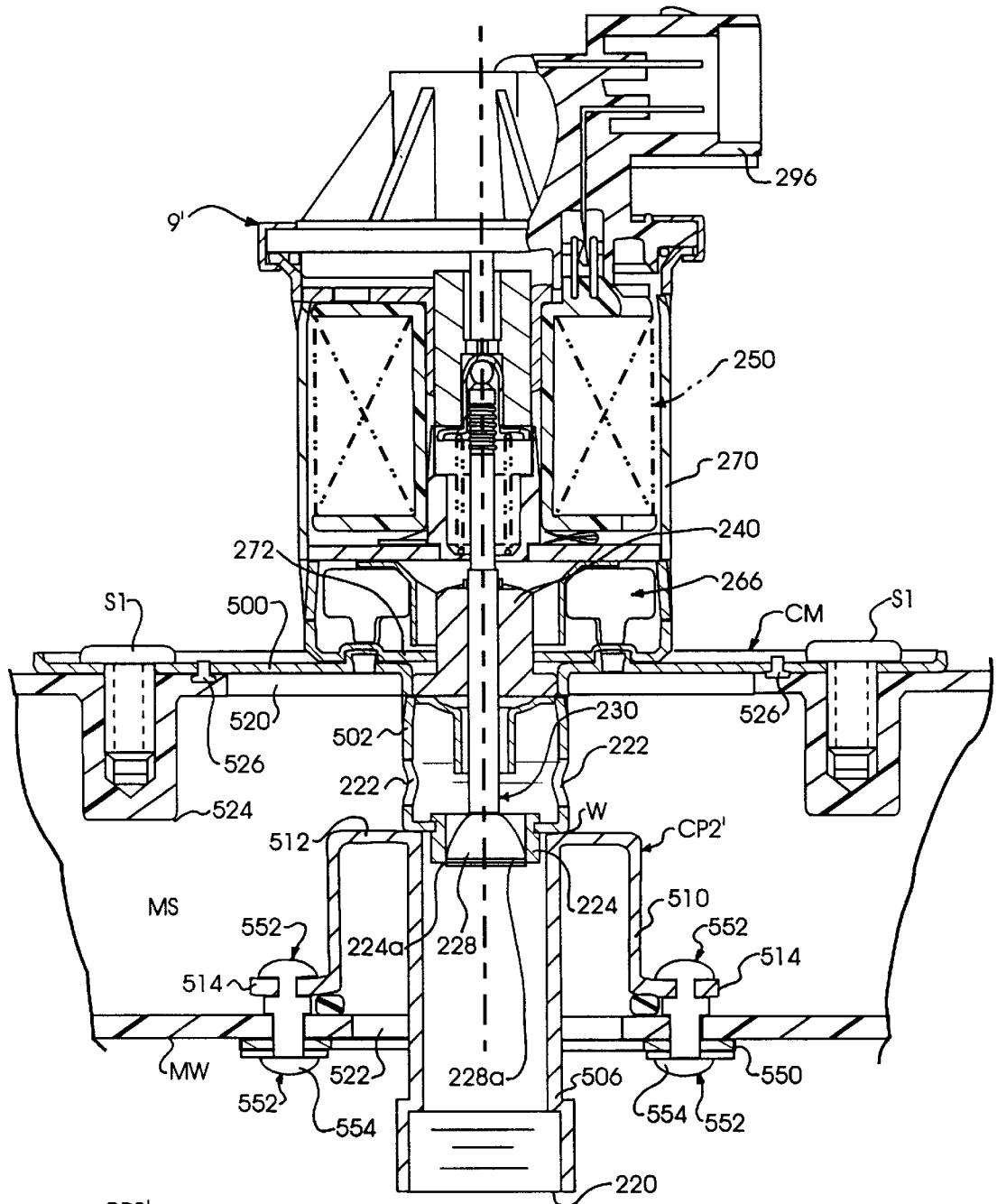
FIG. 18 shows a modified form of the second valve of FIG. 1A and mounting on a manifold.
Figure 20:
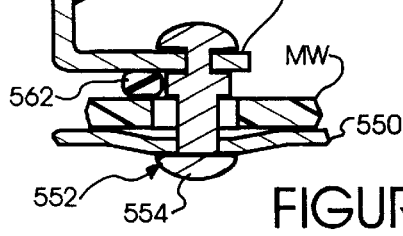
FIG. 20 is a fragmentary cross section view in the direction of arrows 20—20 in FIG. 19.
Figure 19:
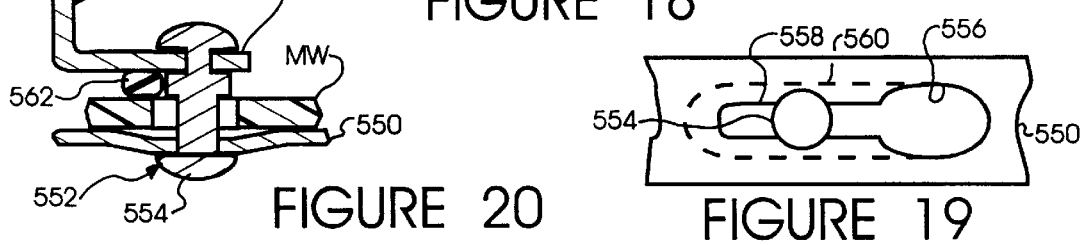
FIG. 19 is a fragmentary view in the direction of arrow 19 in FIG. 18.

FIGS. 18, 19, and 20 are like FIG. 15 except for the attachment of rim 514 to the manifold wall margin around opening 522. A retaining ring 550 on the exterior of the manifold secures rim 514 of part CP2' to the manifold wall around opening 522. Studs 552 extend from rim 514 at several circumferential locations about the rim through holes in manifold wall MW. These studs have external heads 554. Retaining ring 550 has oversize holes 556 that allow ring 550 to pass over heads 554. When the ring is then turned about axis AX, the studs enter slots 558 that extend from oversize holes 556 so that each head 554 overlaps the side margins of a corresponding slot 558. Increasingly forceful locking may be attained by including a ramp formation 560 that draws the parts increasingly tighter together as ring 550 is turned. A circular sealing gasket 562 is disposed at least between rim 514 and manifold wall MW radially inward of studs 552.

Any of the configurations for the EGR valve seat may be used with any of the alternatives for force-balancing, or force-compensating, of the valve. FIGS. 17 and 18 show a valve stem that is of constant diameter, unlike those of FIGS. 1A, 15 and 16 which have the different sections of different diameters for force-balancing, or force-compensation. All EGR valves shown and described herein comprise parts in assembly relation that allows such an assembly to be mounted on a manifold by insertion through the larger opening 520. Parts CM, CP2, CP2', and CP2" constitute mounts that are fastened to the manifold wall, as illustrated and described, so that secure, gas-tight sealing of an assembly to the manifold wall is accomplished.

While a presently preferred embodiment of the invention has been illustrated and described, it should be appreciated that principles are applicable to other embodiments that fall within the scope of the following claims.

What is claimed is:

1. An internal combustion engine intake manifold, comprising:

a wall separating internal manifold space from an external space, a purge valve for purging fuel vapors from an evaporative emission space of a fuel storage system for the engine, the purge valve comprising:

a purge valve body having a purge inlet port for receiving fuel vapors from the evaporative emission space and a purge outlet port for delivering fuel vapors to the internal manifold space, a purge valve mount for mounting the purge valve body on the wall external to the internal manifold space and placing the purge outlet port in communication with the internal manifold space, and an EGR valve for recirculating engine exhaust gases, the EGR valve comprising:

an EGR body, an EGR inlet port for receiving engine exhaust gases, and an EGR outlet port for delivering engine exhaust gases to the internal manifold space, and an EGR valve mount for mounting the EGR valve body on the wall such that the EGR outlet port is communicated to the internal manifold space, wherein the purge outlet port communicating with the intake manifold space is upstream of the EGR outlet port communicating with the intake manifold space.

2. An internal combustion engine intake manifold as set forth in claim 1 in which the manifold wall comprises plastic material.

3. An internal combustion engine intake manifold as set forth in claim 1 in which the purge valve mount mounts the purge valve body such that a portion of the purge valve body that contains the purge outlet port confronts the wall, and the portion of the wall confronted by that portion of the purge valve body comprises an opening through which the outlet port directly communicates with the internal manifold space.

4. An internal combustion engine intake manifold as set forth in claim 1 in which the purge valve outlet port comprising a nipple, the wall comprising an opening through which the nipple passes to communicate the purge valve outlet port with the internal manifold space.

5. An internal combustion engine intake manifold as set forth in claim 1 in which the wall comprises opposite wall portions each containing a respective through-hole, the EGR mount comprises a first mounting portion on the valve body mounting the EGR valve body on the manifold wall in closure of a first of the manifold wall through-holes, and a second mounting portion that comprises a tube for conveying exhaust gases to the EGR valve inlet port and a surrounding wall in closure of a second of the manifold wall through-holes, the surrounding wall coacting with the tube to form an annular space that surrounds the tube, protrudes through the second through-hole, and extends to at least the edge of the second through-hole.

6. An internal combustion engine intake manifold as set forth in claim 1 in which the EGR outlet port is disposed in the internal manifold space and the EGR inlet port is disposed external to the manifold space.

7. An assembly, comprising:

an engine manifold having an interior space;

a fuel vapor purge valve mounted on the engine manifold and having an outlet port directly communicating with the interior space; and an exhaust gas recirculation valve mounted on the engine manifold and having an outlet port directly communicating with the interior space, the exhaust gas recirculation valve outlet port communicating with the interior space downstream of the purge valve outlet port communicating with the interior space.

8. The assembly as set forth in claim 7, wherein the manifold comprises plastic material.

9. The assembly as set forth in claim 7, wherein the manifold is an intake manifold of an internal combustion engine.

10. The assembly as set forth in claim 7, wherein the outlet port of each valve is disposed within the interior space of the manifold.

* * * * *